US012541525B2

(12) United States Patent
Felbah et al.

(10) Patent No.: US 12,541,525 B2
(45) Date of Patent: Feb. 3, 2026

(54) SYSTEM AND METHOD OF KEYWORD-SENSITIVE SEMANTIC SEARCH SCORING FOR ARTIFICIAL INTELLIGENCE PRODUCTIVITY TOOL-ENABLABLE APPLICATION CAPABILITIES FOR A USER QUERY INPUT

(71) Applicant: Dell Products LP, Round Rock, TX (US)

(72) Inventors: Daniel Felbah, Toledo, OH (US);
Ashutosh Singh, Austin, TX (US);
Mona Sachdev, Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/778,035

(22) Filed: Jul. 19, 2024

(65) Prior Publication Data

US 2026/0023748 A1 Jan. 22, 2026

(51) Int. Cl.
*G06F 16/2457* (2019.01)
*G06N 3/044* (2023.01)

(52) U.S. Cl.
CPC ....... *G06F 16/24578* (2019.01); *G06N 3/044* (2023.01)

(58) Field of Classification Search
CPC .......................... G06F 16/24578; G06N 3/044
See application file for complete search history.

(56) References Cited

U.S. PATENT DOCUMENTS

| 10,146,593 | B2 | 12/2018 | Gong |
| 10,249,207 | B2 * | 4/2019 | Solomon .................. G09B 7/04 |
| 11,501,177 | B2 * | 11/2022 | Wang ..................... G06N 5/022 |
| 11,620,262 | B2 | 4/2023 | Lee |
| 11,948,073 | B2 | 4/2024 | Zhang |
| 12,292,940 | B2 * | 5/2025 | Meyer .................... G06Q 30/01 |
| 2018/0075131 | A1 * | 3/2018 | Van Hoof .......... G06F 16/2471 |
| 2018/0365065 | A1 | 12/2018 | Guttman |
| 2020/0387550 | A1 | 12/2020 | Cappetta |

(Continued)

FOREIGN PATENT DOCUMENTS

WO 2020/192587 A1 10/2020

*Primary Examiner* — Etienne P Leroux
(74) *Attorney, Agent, or Firm* — Prol Intellectual Property Law, PLLC; H. Kenneth Prol

(57) ABSTRACT

An on the box artificial intelligence productivity tool may comprise a hardware processor executing computer-readable program code instructions for gathering natural language descriptions of capabilities associated with each of a plurality of AI productivity tool-enablable software applications, generating capability intent values from the natural language descriptions of the gathered capabilities, generating a query input intent value for a user query input received via text or audio requesting an action to be taken by one of the plurality of AI productivity tool-enableable software applications, executing a cosine semantic similarity search comparing the capability intent values to the query input intent value to identify a best match capability for the received user query input having a capability intent value that generates a highest cosine semantic similarity search score, and instructing a first of the plurality of AI productivity tool-enableable software applications having the best match capability to execute the best match capability.

20 Claims, 6 Drawing Sheets

(56) References Cited

U.S. PATENT DOCUMENTS

| | | |
|---|---|---|
| 2020/0394360 A1 | 12/2020 | Dunn |
| 2021/0256207 A1 | 8/2021 | Dunn |
| 2021/0334194 A1 | 10/2021 | Xiao |
| 2021/0366506 A1 | 11/2021 | Han |
| 2021/0374353 A1 | 12/2021 | Zhang |
| 2022/0035684 A1 | 2/2022 | Gupte |
| 2022/0035732 A1 | 2/2022 | Xiao |
| 2022/0092439 A1 | 3/2022 | Liu |
| 2022/0318502 A1 | 10/2022 | Howell |
| 2023/0105806 A1 | 4/2023 | Dunn |
| 2023/0214593 A1* | 7/2023 | Padukone ............... G06F 40/35 704/2 |
| 2023/0222359 A1 | 7/2023 | Panikkar |
| 2023/0237263 A1 | 7/2023 | Howell |
| 2023/0251962 A1 | 8/2023 | Xiao |
| 2024/0054318 A1 | 2/2024 | Feltin |
| 2024/0061719 A1 | 2/2024 | Reddy |
| 2024/0069770 A1 | 2/2024 | Prabhakar |
| 2024/0069959 A1 | 2/2024 | Prabhakar |
| 2024/0070113 A1 | 2/2024 | Prabhakar |
| 2024/0161003 A1 | 5/2024 | Alexander |

\* cited by examiner

SYSTEM AND METHOD OF KEYWORD-SENSITIVE SEMANTIC SEARCH SCORING FOR ARTIFICIAL INTELLIGENCE PRODUCTIVITY TOOL-ENABLABLE APPLICATION CAPABILITIES FOR A USER QUERY INPUT

FIELD OF THE DISCLOSURE

The present disclosure generally relates to execution of computer readable code instructions of artificial intelligence (AI) productivity tools with an information handling system. The present disclosure more specifically relates systems and methods of identifying an artificial intelligence productivity tool-enableable software application capability that is a best match for an action requested by a user within a received user query input using a keyword-sensitive or text frequency-inverse document frequency (TF-IDF) weighted score for a semantic similarity search across a plurality of such capabilities.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more software applications such as workspace productivity applications, or gaming applications or the like. Further, the information handling system may include AI productivity tools that interface with various AI productivity tool-enablable software applications such as natural language chat-enabled environments for interface with services of software applications that increase the efficiency of the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
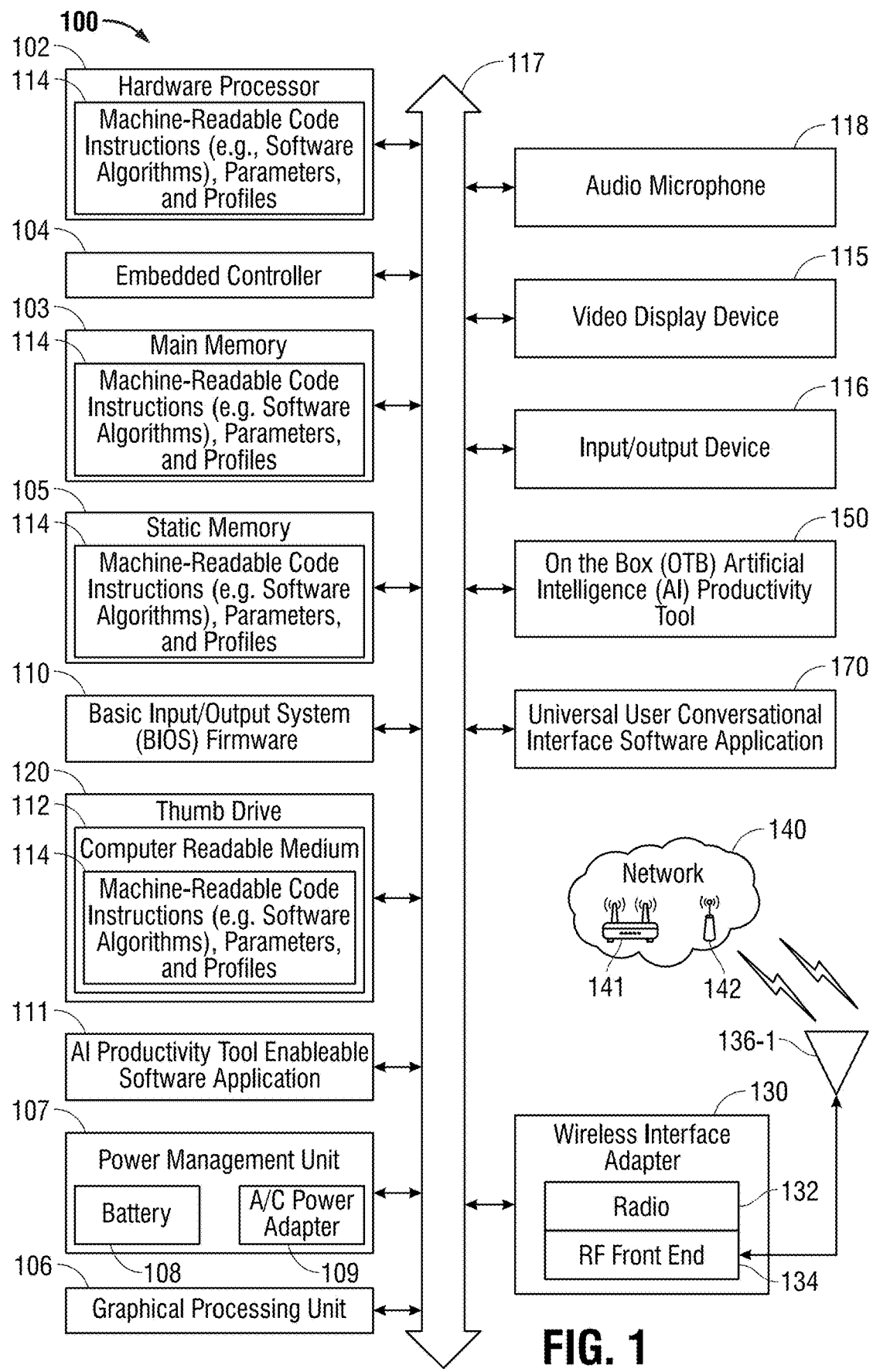
FIG. 1 is a block diagram illustrating an information handling system that includes an on the box (OTB) artificial intelligence (AI) productivity tool to select among a plurality of AI productivity tool-enablable software application capabilities for services, operations, or responses to a user query input according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and interactions with humans. An example of AI technologies includes, but is not limited to, chat-enabled environments (voice, text, etc.). These chat-enabled environments are described in embodiments herein as an on the box (OTB) AI productivity tool that receives this voice or text input from a user and implements a number of actions or utilizes services of various software applications based on the natural language of the input. In some information handling systems, the OTB AI productivity tool may interface with various AI productivity tool-enablable software applications being executed or executable on the information handling system. These AI productivity tool-enablable software applications may integrate with the OTB AI productivity tool to allow user queries to trigger certain actions declared, supported, and managed by these AI productivity tool-enablable software applications.

A hardware processor executing code instructions of the OTB AI productivity tool in embodiments herein may match these received user queries, or user query inputs to known capabilities of one or more of the AI productivity tool-enableable software applications through execution by a hardware processor of machine readable code instructions for one or more natural language processing machine learning models. This process includes gathering, either in real-time or prior to execution of the OTB AI productivity tool, capabilities associated with each of a plurality of AI productivity tool-enablable software applications. These capabilities (also called capability intents and having capability intent values) may describe those functionalities of each of the AI productivity tool-enablable software applications that may be used when interfacing with the OTB AI productivity tool. These natural language descriptions of the capabilities for the AI productivity tool-enableable software applications may be stored within a natural language capability database for comparison to received user query inputs, for example, in order to identify a capability most likely to address a user's request within the received user query inputs.

A hardware processor executing machine readable code instructions for a capability intent value generator of the OTB AI productivity tool may determine capability intent values associated with these natural language descriptions of the gathered capabilities for each of a plurality of AI productivity tool-enablable software applications. These capability intent values are a mathematical representation of capability operations or services from various AI productivity tool-enablable software applications in embodiments herein. These capability intent values may be represented by a mathematical value in a multi-axis vector space that may be associated with a natural language description for that capability or intent. In an embodiment, the capabilities may be associated with an identification (ID) such as an alphanumeric ID that also may be stored within a capability intent values database. Generating such capability intent values as vectors may be a first step in a natural language processing method to determine and correlate the user's query intent or requested action within a user query input that takes into account the context or semantics of the words used within the user query input with one of a plurality of capabilities.

Upon receipt of a user query input by the OTB AI productivity tool in embodiments herein, a hardware processor executing code instructions of a query intent determination module may determine a vectorized query input intent value for the user query input that may be comparable to the capability intent values. The hardware processor executing machine readable code instructions for a query intent to capability determination module in embodiments herein may then perform one or more similarity search methods to match the query input intent value with a capability intent value in order to identify a capability for an AI productivity tool-enableable software application that most closely corresponds and can address the user request within the user query input. A methodology for matching text or documents in embodiments herein may center upon keyword searches, such as term frequency-inverse document frequency (TF-IDF) searches. TF-IDF searches in this context focus upon the frequency of a term or keyword found within a user query input and within known capabilities for the AI productivity tool enableable software applications. TF-IDF methodologies lack the ability to determine context of the various keywords identified within the user query input, however. For example, TF-IDF methodologies cannot discern between different meanings for the same word or identify synonyms for keywords, which people routinely employ in natural language conversation. This may result in limits for matching between natural language text excerpts, such as the user query input and the software service or function described in a natural language capability for an AI productivity tool-enableable software application.

In embodiments herein, a hardware processor may execute machine readable code instructions for a semantic similarity search machine learning model that analyzes and weighs context and relevancy to overcome this disadvantage of TF-IDF methodologies. For example, in embodiments herein, a hardware processor may execute machine readable code instructions for a semantic similarity search machine learning model, via a query intent to capability module, that compares the vectorized user query input intent value and the capability intent values stored within the capability intent values database. Such a comparison may be performed using a semantic search machine learning model, such as a cosine similarity search that compares the distance or value difference in a multi-axis vector space between two vectors (e.g., the capability intent value vector and the user query input value vector) to determine the contextual similarity between the natural language description of the capability and the natural language user query input. Such a contextual or semantic search methodology may take into account the fact that the same word may have two meanings or consider synonyms of words, for example. This may be performed for several of the capability intent values stored within the capability intent value database to identify a capability intent value that most closely matches the user query input value. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

While semantic search methodologies are better-suited for use with natural language text excerpts than TF-IDF methodologies that do not consider context, TF-IDF methodologies are better-suited than semantic search methodologies where a single keyword within the user query input is most important to identifying a matching capability for an AI productivity tool-enableable software application to address the user's concerns. For example, a user may provide a natural language user query input such as "resolve error code 0xc0000142." In such a scenario the semantic search methodologies may identify that an error code needs to be resolved, but it may not focus heavily on the term "0xc0000142," which may be critical to finding the right AI productivity tool enableable software application to resolve the error code. In such a case, it may be useful to also perform a TF-IDF comparison across the stored natural language descriptions of the capabilities within the natural language capabilities database to identify the capability that best addresses the specific term "0xc0000142," according to embodiments herein.

As described in embodiments herein, a hardware processor executing machine readable code instructions for the query intent to capability determination module of the OTB AI productivity tool may compare the vectorized user query input intent value and each of several capability intent values using a semantic search approach, such as a cosine similarity search or comparison. Thus, the hardware processor executing machine readable code instructions for the query intent to capability determination module may compare a single user query input to a plurality of natural language capabilities for AI productivity tool enableable software applications. In order to increase the accuracy of these semantic comparison results, the hardware processor executing machine readable code instructions for the query intent to capability determination module of the OTB AI productivity tool in embodiments herein may, for each compared user query input and natural language capability, perform a TF-IDF comparison. The output of the semantic search comparison may then be weighted by the TF-IDF comparison for each natural language capability compared to the user query input, via the hardware processor executing machine readable code instructions of the query intent to capability determination module. The natural language capability for an AI productivity tool enableable software application having the highest weighted score may then be identified, via execution of machine readable code instructions of the query intent to capability determination module by the hardware processor as the capability most likely to address the user's intended request within the natural language user query input. In such a way, the hardware processor executing code instructions for the query intent to capability module for the OTB AI productivity tool may enhance semantic search performance by also considering critical keywords when determining a matching capability of an AI productivity tool enableable software application that is most likely to address the user's intent within the user query input.

Turning now to the figures, FIG. 1 illustrates an information handling system 100 similar to the information handling systems according to several aspects of the present disclosure. As described herein, hardware processor 102 executing machine-readable code instructions of an on the box (OTB) artificial intelligence (AI) productivity tool 150 in an embodiment may perform one or more similarity search methods to match a received query and query input intent value with a capability intent value and capability in order to identify a capability for an AI productivity tool-enableable software application 111 that can address the user request within the user query input. The OTB AI productivity tool 150 in an embodiment may receive, via a universal user conversational interface software application 170 or other audio or text interface, a voice or text input from a user, described herein as a user query input, that requests actions or services of various software applications in natural language. The hardware processor 102 may execute machine readable code instructions for a semantic similarity search machine learning model that analyzes and weighs context and relevancy of the natural language within the user query input to identify a registered capability, also provided in natural language description, for an AI productivity tool enableable software application 111 that may perform the action or service requested within the user query input. Use of such a semantic similarity search in embodiments herein may overcome disadvantages of term frequency-inverse document frequency (TF-IDF) search or comparison methodologies that do not consider context within natural language but also include advantages of TF-IDF in embodiments herein.

In an embodiment, the hardware processor 102 executing machine readable code instructions for the OTB AI productivity tool 150 may similarity match or correlate received user queries, or user query inputs to known capabilities of one or more of the AI productivity tool-enableable software applications, such as 111 by comparing natural language descriptions of the known capabilities to the natural language text of the user query input. This process in an embodiment may include gathering, either in real-time or prior to execution of the OTB AI productivity tool 150, capabilities associated with each of a plurality of AI productivity tool-enablable software applications, such as 111, and describing in natural language functionalities of each of the AI productivity tool-enablable software applications that may be used when interfacing with the OTB AI productivity tool 150.

The hardware processor 102 executing machine readable code instructions of the OTB AI productivity tool 150 may determine capability intent values associated with natural language descriptions of the gathered capabilities for each of a plurality of AI productivity tool-enablable software applications, such as 111. These capability intent values are a mathematical representation of descriptors of the capability operations or services from various AI productivity tool-enablable software applications and may be represented by a mathematical value that is an embedded capability intent value in a multi-axis vector space that may be associated with a natural language description for that capability or intent. The hardware processor 102 may execute machine readable code instructions of the OTB AI productivity tool 150 to perform a cosine similarity search or comparison that compares a vectorized user query input intent value and vectorized capability intent values to determine the contextual similarity between the natural language description of the capability and the natural language user query input. This may be performed for several of the capability intent values to identify a capability intent value that most closely matches or correlates with the user query input value. In such a way, the hardware processor 102 executing code instructions for the OTB AI productivity tool 150 may take relevance and context of natural language within a user query input into account when determining a matching or correlating capability of an AI productivity tool enableable software application 111 that is most likely to address the user's intent within the user query input.

In another embodiment, in order to increase the accuracy of the above-described semantic search or comparison results, such as the cosine semantic similarity algorithm, the hardware processor 102 executing machine readable code instructions for the OTB AI productivity tool 150 in an embodiment may, for each compared user query input and natural language capability, also perform a TF-IDF comparison. The output of the semantic search comparison may then be weighted by the TF-IDF comparison for each natural language capability compared to the user query input, via the hardware processor 102 executing machine readable code instructions of OTB AI productivity tool 150. The natural language capability for an AI productivity tool enableable software application 111 having the highest weighted score may then be identified, via execution of machine readable code instructions of the OTB AI productivity tool 150 by the hardware processor 102 as the capability most likely to correlate and address the user's intended query request within the natural language user query input received via the universal user conversational interface software application 170 or other user input interface. In such a way, the hardware processor 102 executing code instructions for the OTB AI productivity tool 150 may enhance semantic search performance by also considering critical keywords when determining a matching capability of an AI productivity tool enableable software application 111 that is most likely to address the user's intent within the user query input.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 120. The information handling system 100 may include or interface with one or more communications ports for communicating with external devices, as well as an input/output (IO) device 116, a video/graphics display device 115, an audio microphone 118 for recording user communications, or any combination thereof. Portions of an information handling system 100 may themselves be considered information handling systems 100.

Information handling system 100 may include devices or modules that embody one or more of the hardware devices or hardware processing resources executing machine readable code instructions for one or more software or firmware systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate on a plurality of information handling systems 100. In a specific embodiment, code instructions for the OTB AI productivity tool 150, the universal user conversational interface software application 170, and one or more AI productivity tool enableable software applications 111 may execute locally at the information handling system 100, or on the box.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 120 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 116 as well as between hardware processors 102, an EC 104, GPU 106 or other, the operating system (OS) 111, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 116 described herein. As described herein, the information handling system 100 further includes a video/graphics display device 115. The video/graphics display device 115 in an embodiment may function as a liquid crystal display (LCD), an organic light emitting diode (OLED), a flat panel display, or a solid-state display. It is appreciated that the video/graphics display device 115 may be wired or wireless and may be an external video/graphics display device 115 that allows a user to increase the desktop area by extending the desktop in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, hardware processor or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, EC 104 or any other hardware processing resource and may include software agents, or other aspects or components used to execute the methods and systems described herein. Various software modules comprising application machine readable code instructions 114 may be coordinated by an OS 111, and/or via an application programming interface (API) include a unified device API described herein. An example OS 111 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 120 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 120 during execution by the hardware processor 102, EC 104, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 120 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 120, the hardware processor 102 (e.g., CPU), the EC 104, the GPU 106, a video/graphic display device 115, or other wired I/O devices 116 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 105 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
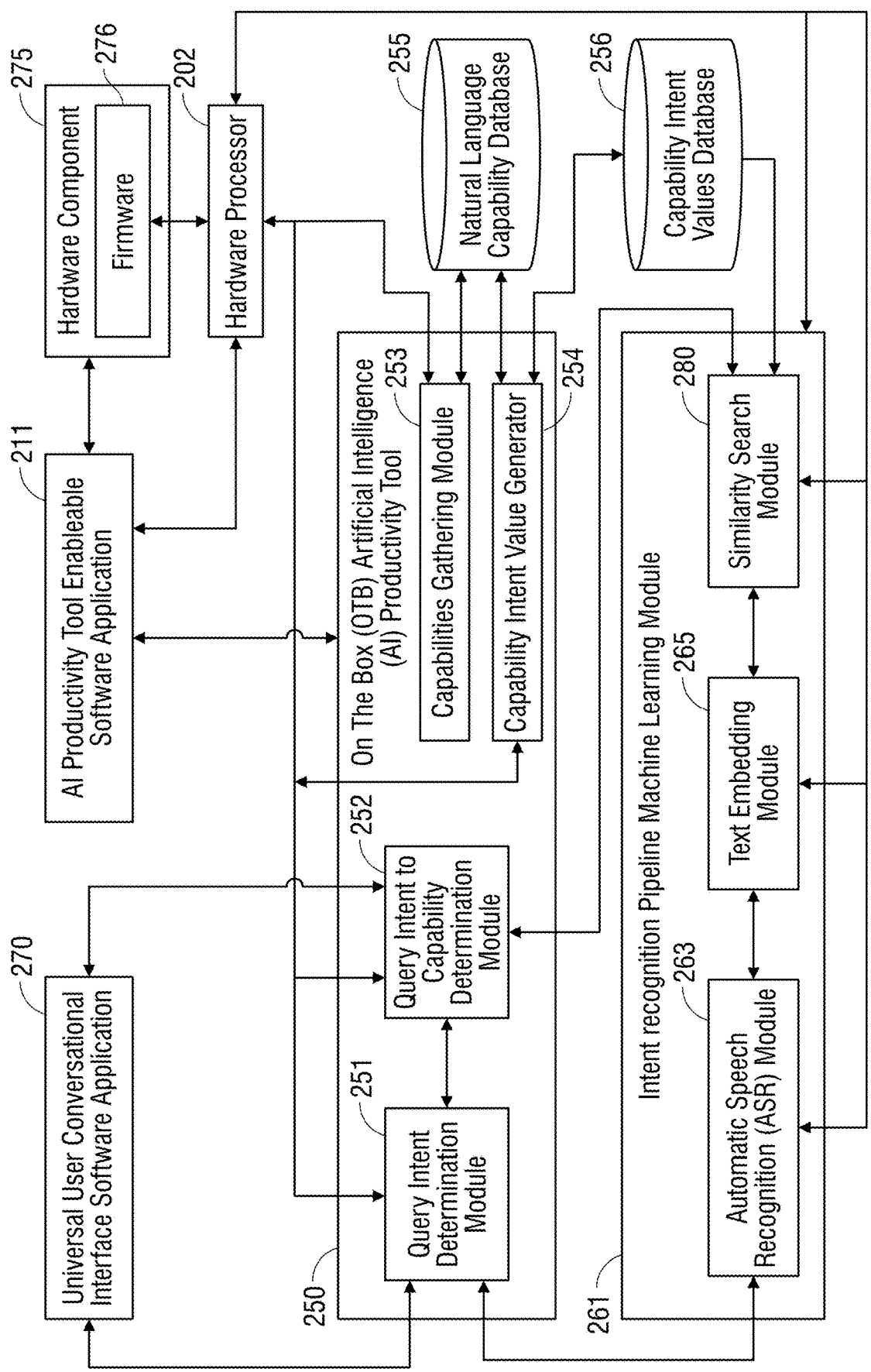
FIG. 2 is a block diagram illustrating computer readable code instructions for an OTB AI productivity tool executable on an information handling system for matching a determined query intent value for a user's query input to a registered capability intent value for an AI productivity tool-enablable software application according to an embodiment of the present disclosure.

FIG. 2 is a block diagram illustrating an on the box (OTB) artificial intelligence (AI) productivity tool for correlating a determined query intent value for a user's query input to a registered capability intent value for an AI productivity tool-enablable software application according to an embodiment of the present disclosure. The AI productivity tool enableable software application 211 in an embodiment may then execute a responsive capability for operations, software services, or generating a response to meet the chatbot input query. A manufacturer of edge devices, such as personal or enterprise computers, may develop and install on individual edge device information handling systems machine readable code instructions for an OTB AI productivity tool 250 that employs one or more locally executed machine learning models, such as 263, 265, or 267, to optimize user productivity and performance with the information handling system using artificial intelligence methodologies. Examples of artificial intelligence methodologies includes ML model algorithms used with chatbots, such as universal user conversational interface software application 270 to simulate conversations between the information handling system executing machine readable code instructions of the AI productivity tool enableable software application 211 and the user, via the OTB AI productivity tool 250 to execute one or more capabilities for an application software service, response or other function in response to a user query input. For example, a response to a user query via OTB AI productivity tool 250 may trigger processes of one or more AI productivity tool enableable software applications 211 in embodiments herein.

The OTB AI productivity tool 250 in an embodiment may receive, via a universal user conversational interface software application 270 or other interface, a voice or text input from a user, described herein as a user query input, that requests actions or services of various software applications in natural language. A hardware processor 202 executing code instructions of the OTB AI productivity tool 250 in an embodiment may match these received user queries, or user query inputs to known capabilities of one or more of the AI productivity tool-enableable software applications 211 through execution by the hardware processor 202 of machine readable code instructions for one or more natural language processing machine learning models. AI productivity tool enableable software application 211 may have or publish a list of recognized "capabilities" or functionalities that it may perform during execution of such an AI productivity tool enableable software application 211 in response to a query input received and processed by the OTB AI productivity tool 250 into a query intent vector value. The capabilities are provided text descriptors that may be processed into vectorized capability intent values in a multi-axis vector space such that these intent value mathematical representations of a query and a capability may be correlated by a similarity matching algorithm to select a capability responsive to an input query from a user.

This process includes gathering, either in real-time or prior to execution of the OTB AI productivity tool 250, via the capabilities gathering module 253, capabilities associated with each of a plurality of AI productivity tool-enablable software applications 211. These capabilities (also called capability intents and having capability intent values) may describe those functionalities of each of the AI productivity tool-enablable software applications 211, that may be used when interfacing with the OTB AI productivity tool 250. These natural language descriptions of the capabilities for the AI productivity tool-enableable software applications 211 may be stored within a natural language capability database 255 for comparison to received user query inputs, for example, in order to identify a capability most likely to address a user's request within the received user query inputs.

The hardware processor 202 executing machine readable code instructions for a capability intent value generator 254 of the OTB AI productivity tool 250 may determine capability intent values associated with natural language descriptions of the gathered capabilities for each of a plurality of AI productivity tool-enableable software applications 211. These capability intent values are a mathematical representation of the natural language descriptions of capability operations or services from various AI productivity tool-enableable software applications 211 in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a capability intent values database 256. Generating such capability intent values as vectors may be a first step in a natural language processing method to determine a capability corresponding to and responsive to the user's intent or requested action within a user query input that takes into account the context or semantics of the words used within the user query input.

In an embodiment, the capability intent values database 256 may store a plurality of capabilities associated with each of a plurality of AI productivity tool-enableable software applications 211 with a name, capability ID, natural language descriptor, or a capability intent value in some embodiments. These capabilities stored at the capability intent values database 256 may include any input and output capabilities provided by the AI productivity tool-enablable software applications 211 being executed by the hardware processor 202 or any other hardware processing devices (104 or 106 of FIG. 1). For example, an AI productivity tool-enablable software application 211 may include a word processing application such as Microsoft® Word® that may receive input (e.g., via voice at a microphone 118 or text via a keyboard 116 of FIG. 1) and provide output via text. Still further, other examples of an AI productivity tool-enablable software application 211 may include an updating software, virus protection software, and setting optimization software such as Dell® SupportAssist® module executable by the hardware processor or other hardware processing resource of the information handling system. With SupportAssist® a user may provide input via, for example, the microphone (118 of FIG. 1) requesting information related to a setting associated with the information handling system. Thus, capabilities of SupportAssist® may include virus protection capabilities, setting manipulation capabilities, and software updating capabilities that may each be stored at the capability intent values database 256.

Even further, examples of an AI productivity tool-enablable software application 211 may include Dell® Display®/Peripheral Manager®. The Dell® Display®/Peripheral Manager® may have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® software may have capability intent values and a capability identifier stored at the capability intent values database 256 as described herein. It is appreciated that the AI productivity tool-enablable software application 211 may include, for example, Dell® Trusted Device® software, a remediation Dell® APEX Managed Device Service (AMDS)® software, Alienware Command Center (AWCC)® software, among others. Some AI productivity tool-enablable software applications 211 may even be subagents operating locally on the box of the information handling system but have remote access to a larger software application executing at a cloud based server location for providing software services in some embodiments herein.

These "capabilities" may be registered with the OTB AI productivity tool 250 in an embodiment for establishing capability intent values for these capabilities such that chat user query input intent values may be correlated with one or more capability intent values for registered capabilities, as described herein. For example, in an embodiment in which the AI productivity tool enableable software application 211 is software application for optimizing performance of hardware components at the information handling system, such capabilities may include adjusting settings or configurations for various hardware components. As another example, in an embodiment in which the AI productivity tool enableable software application 211 optimizes performance of other software applications, such capabilities may include automatically downloading and installing updates for such AI productivity tool enableable software applications 211. In yet another example, in an embodiment in which the AI productivity tool enableable software application 211 is one of several software applications routinely executing on the information handling system, and optimized by such an OTB AI productivity tool 250, such capabilities may include automatically generating and transmitting e-mails or text messages, automatically scheduling meetings, or generating chatbot or other user interface responses. These "capabilities" may be registered, associated with a specific AI productivity tool enableable software application 211, and stored with capability name, capability ID, natural language descriptor, capability intent value, or other data at the capability intent values database 256 in an embodiment.

Each of the capabilities stored at the capability intent values database 256 may have a description with text descriptors, may be associated with a unique ID, and may have a capability intent value in an embodiment. Upon registration of a given capability by the AI productivity tool enableable software application 211 in an embodiment, a hardware processor 202 for the information handling system may execute machine readable code instructions for one or more text embedding algorithms to generate a multi-dimensional vector capability intent value for that capability that, for example, may be based on text descriptors for that capability. Each of these capability intent values for association with these capabilities may also be associated with an ID such as an alphanumeric ID that may identify, uniquely, these capabilities in the capability intent values database 256, for example. These capability intent values may later be used to determine which of the capabilities a user intends to invoke or execute within a received user query input based on similarity with a query intent value, as described herein.

Upon determination of a capability intent value for each of the gathered or registered AI productivity tool enableable software application capabilities, the OTB AI productivity tool 250 may begin processing received user query inputs from the universal conversational interface software application 270 or other interface for execution of capabilities for an application software service, response or other function corresponding to one of these capability intent values. In an example embodiment, a user may provide a user query input in the form of text or voice data (e.g., via IO device 116, or microphone 118 of FIG. 1) to a universal user conversational interface software application 270, executing machine readable code instructions as a chatbot with the OTB AI productivity tool 250 to simulate a conversation between the user and the AI productivity tool enableable software application 211. When a user provides a user query input in the form of text or voice data (e.g., via IO device 116, or microphone 118 of FIG. 1) to the universal user conversational interface software application 270, the hardware processor 202 executing machine-readable code instructions of the OTB AI productivity tool 250 in an embodiment may orchestrate assessment of the user's intended goals within the user query input (e.g., what the user wishes to achieve with this communication) with determination of a query input intent value, and identify one or more capabilities associated with the AI productivity tool enableable software application 211 having a correlating capability intent value and that is capable of executing a response to this user query input intent. Further, the OTB AI productivity tool 250 may initiate performance of one or more tasks employing those capabilities to achieve the user-intended results to the user query input.

This orchestration in an embodiment may begin with the hardware processor 202 executing machine-readable code instructions of the query intent determination module 251 to receive the user query input via microphone, image, or text input, and initiate execution of machine readable code instructions for an intent recognition pipeline machine learning module 261. In an embodiment, the hardware processor 202 executing machine-readable code instructions for the intent recognition pipeline machine learning module 261 may further orchestrate any combination of a plurality of machine learning modules (e.g., 363, 365, or 380) to process the audio or text input to determine the user's intended goal or query intent within the received text or voice data of the user query input. During operation for example, the hardware processor 202 executing machine-readable code instructions of the query intent determination module 251 may load one or more machine learning models such that, for example, the text or voice input from the user may be processed through a speech recognition model 263 and/or processed through any of a plurality of natural language models (e.g., 265 or 280) or other ML models in order to determine a text of a user's input query or an intent value of the user's input query. For example, an automatic speech recognition (ASR) module 263, a text embedding module 265, or a similarity search module 280 that work in various combinations with one another to detect a user's audio speech input, conversion to text or detecting text, and detecting an intent, represented by generating a query intent vector value from the text of the user query input received from the universal user conversational interface software application 270 or other interface such as one specific to an AI productivity tool enableable software application. Further, the hardware processor 202 executing machine-readable code instructions of an intent recognition pipeline machine learning module 261 may orchestrate the interplay between each of the ASR module 263, text embedding module 265, and similarity search module 280 to establish a query intent vector value in a multi-axis vector space defined with these machine learning models and correlate that query intent value with a corresponding capability intent value in an embodiment. Several text embedding algorithms may be used in various embodiments herein in order to provide a vectorized mathematical representation of semantic understanding for a user query input or for a capability described in natural language. For example, the text embedding module 265 may employ a Latent Semantic Analysis (LSA) or Latent Dirichlet allocation (LDA) which may define how close each of the observed terms in the received user query input are to various synonyms. As another example, the text embedding module 265 may employ a Word2Vec algorithm, which includes a neural network trained to understand which terms or phrases should be considered closer or further away from certain synonyms or antonyms. As yet another example, the text embedding module 265 may employ a fully recurrent neural network trained to consider the order of terms within the received user query input or the natural language descriptors of the capabilities for the AI productivity tool enableable software applications 211.

In an embodiment in which the user provides text data to the AI productivity tool enableable software application 211, such an intent recognition pipeline machine learning module 261 may truncate this process to exclude processes of the ASR module 263. The hardware processor 202 executing machine-readable code instructions of the intent recognition pipeline machine learning module 261 in an embodiment may apply the text embedding module 265 to generate a query intent value as described and then return the output query intent value of the text embedding module 265 to the query intent to capability determination module 252. The query intent to capability module may utilize the similarity search module 280 for a correlation between the query intent value received and a stored capability intent value. Such a similarity search module 280 in an embodiment may perform a semantic similarity search or a weighted semantic similarity search that includes a text frequency-inverse document frequency (TF-IDF) comparison between the received user query input and each of the gathered natural language capabilities stored in the natural language capabilities database 255, as described in greater detail below with respect to FIGS. 3-5.

For example, the detected intent having a query intent value in a multi-axis vector space, such as "decrease display brightness," "speed up my application," or "send a text message" may be associated with a known capability or functionality of AI productivity tool enableable software application 211 at the information handling system. More specifically, the intent "decrease display brightness" may be associated with a capability for adjusting settings or configurations for a display device (115 of FIG. 1), based on similarity correlation between a query intent value and a capability intent value as determined by the similarity search module 267. As another example, the query intent "speed up my application" may be associated with a capability associated with the AI productivity tool enableable software application 211 for automatically downloading and installing updates for such AI productivity tool enableable software application 211, based on similarity correlation between a query intent value and a capability intent value as determined by the similarity search module 267. In yet another example, the query intent "send a text message" may be associated with a capability of the AI productivity tool enableable software application 211 to automatically generate and transmit text messages, based on similarity correlation between a query intent value and a capability intent value as determined by the similarity search module 267. As described above, these "capabilities" may be registered and associated with a specific AI productivity tool enableable software application 211 at the capability intent value database 256 in an embodiment.

Upon identification of a capability that addresses the determined query "intent" of the user within the received user query input, the hardware processor 202 executing machine-readable code instructions of the OTB AI productivity tool 250 may direct execution of one or more processes at the AI productivity tool enableable software application 211, via the universal user conversational interface software application 270 associated with that capability. For example, the hardware processor 202 executing machine-readable code instructions of the query intent to capability determination module 252 may directly instruct the AI productivity tool enableable software application 211 to undertake the identified "capability." In such a way, the OTB AI productivity tool 250 may orchestrate a plurality of machine learning modules via an intent recognition pipeline machine learning module 261 to determine a query intent from a received user query input, and identify a corresponding vectorized capability intent value having threshold similar to the query intent value and execute a capability of the AI productivity tool enableable software application 211 to execute this capability as an operation, software service, response, or other function responsive to the user's query input.

Figure 3:
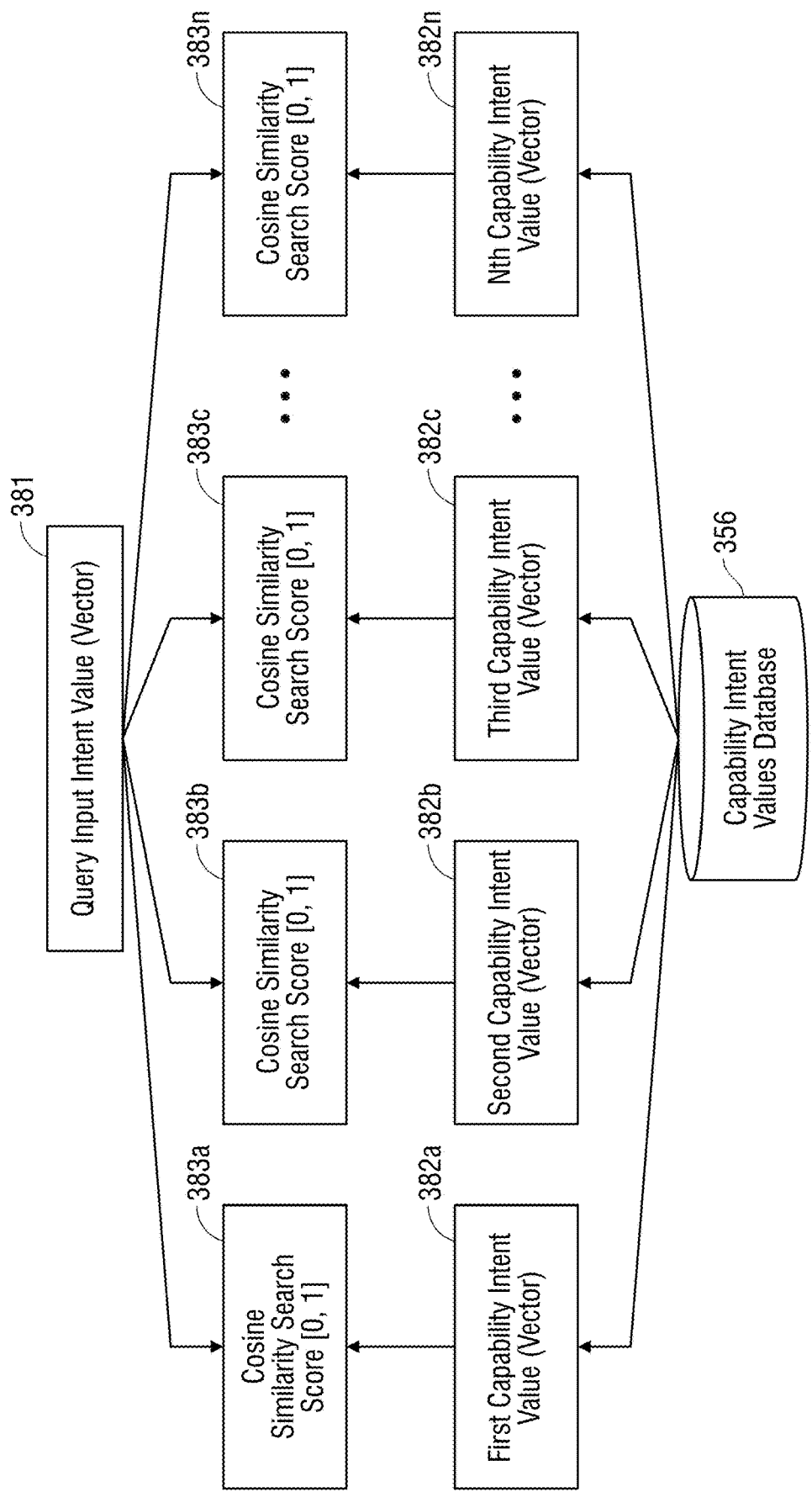
FIG. 3 is a block diagram illustrating a method of executing computer readable code instructions of modules of an OTB AI productivity tool to identify a capability that best matches a received user query input by having a capability intent value that generates a highest cosine similarity search score according to an embodiment of the present disclosure.

FIG. 3 is a block diagram illustrating a method of identifying capability of an artificial intelligence (AI) productivity tool enableable software application that best matches a received user query input by having a capability intent value that generates a highest cosine or other semantic similarity search score during execution of a semantic search machine learning model according to an embodiment of the present disclosure. As described herein, a hardware processor may execute machine readable code instructions for a semantic similarity search machine learning model that analyzes and weighs context and relevancy. For example, in embodiments herein, a hardware processor may execute machine readable code instructions for a semantic similarity search machine learning model, via a query intent to capability module, that compares the vectorized user query input intent value 381 and the capability intent values 382a-382n stored within the capability intent values database 356. Such a comparison may be performed using a semantic search machine learning model, such as a cosine or other semantic similarity search algorithm that compares the distance or value difference in a multi-axis vector space between two vectors (e.g., 381 and each of 382a, 382b, 382c, to 382n) to determine the contextual similarity between the natural language description of the embedded text algorithm generated capabilities having the capability intent values 382a to 382n and the natural language user query input having an user query input intent value 381 generated from an embedded text algorithm. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability and query intent vector values. The cosine similarity search comparison or other semantic similarity search algorithm may be performed for several of the capability intent values (such as 382a, 382b, 382c, to 382n) stored within the capability intent value database 356 to identify a capability intent value (e.g., 382a) that most closely matches the user query input value 381, according to embodiments herein.

As described herein, the natural language capabilities for a plurality of AI productivity tool enableable software applications are provided text descriptors that may be processed into capability intent values, such as 381 in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, a reader's understanding of a given text excerpt may depend upon the reader's knowledge of any given word's meaning within the text, identified phrases within the text, or the understood order or sequence of words within the text. More specifically, the reader's understanding is enhanced by the reader having a larger vocabulary and understanding of which words in that vocabulary are synonyms (closer in meaning) to a given word in that text, and which words are antonyms (further away in meaning) to that given word. As another example, the reader's ability to identify common phrases, such as "in other words" may provide greater insight to the semantic meaning of a text excerpt using this phrase than the reader's understanding of each of the words "in," "other," and "words" used separately from one another. As yet another example, the importance of the order of certain words in an excerpt may impact semantic meaning of the excerpt. More specifically, the phrase "man bites dog" may have a completely different semantic or contextual meaning than the phrase "dog bites man," although each phrase has the same words, just in a different order. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vectors may then be compared to one another in order to understand, not only which individual words are used and their frequencies (as determined through TF-IDF comparison), but also how alike various phrases within the user query input and capabilities are, and how alike the usage of those words and phrases are to provide a context, such as influenced by the order of those words or phrases and their relation to one another.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor executing machine readable code instructions for a semantic search machine learning model of the similarity search module (e.g., 280 of FIG. 2) may determine a distance, that is a value difference of the vector intent values within the multi-axis vector space between the query input intent value 381 and each of a plurality of capability intent values 382*a* to 382*n*. Then, for each of those determined distances, the hardware processor executing machine readable code instructions for a semantic search machine learning model of the similarity search module (e.g., 280 of FIG. 2) may determine an angular similarity having a value between zero and one for the query input intent value 381 and each of a plurality of capability intent values 382*a* to 382*n*. This angular similarity value in an embodiment may comprise the cosine similarity search score (e.g., 383*a*, 383*b*, 383*c* to 383*n*) for a given capability intent value (e.g., 382*a*, 382*b*, 382*c* to 382*n*, respectively), where zero is a worst match and one is a best match between the given capability intent value (e.g., 382*a*, 382*b*, 382*c* to 382*n*) and the query input intent value 381. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

Figure 4:
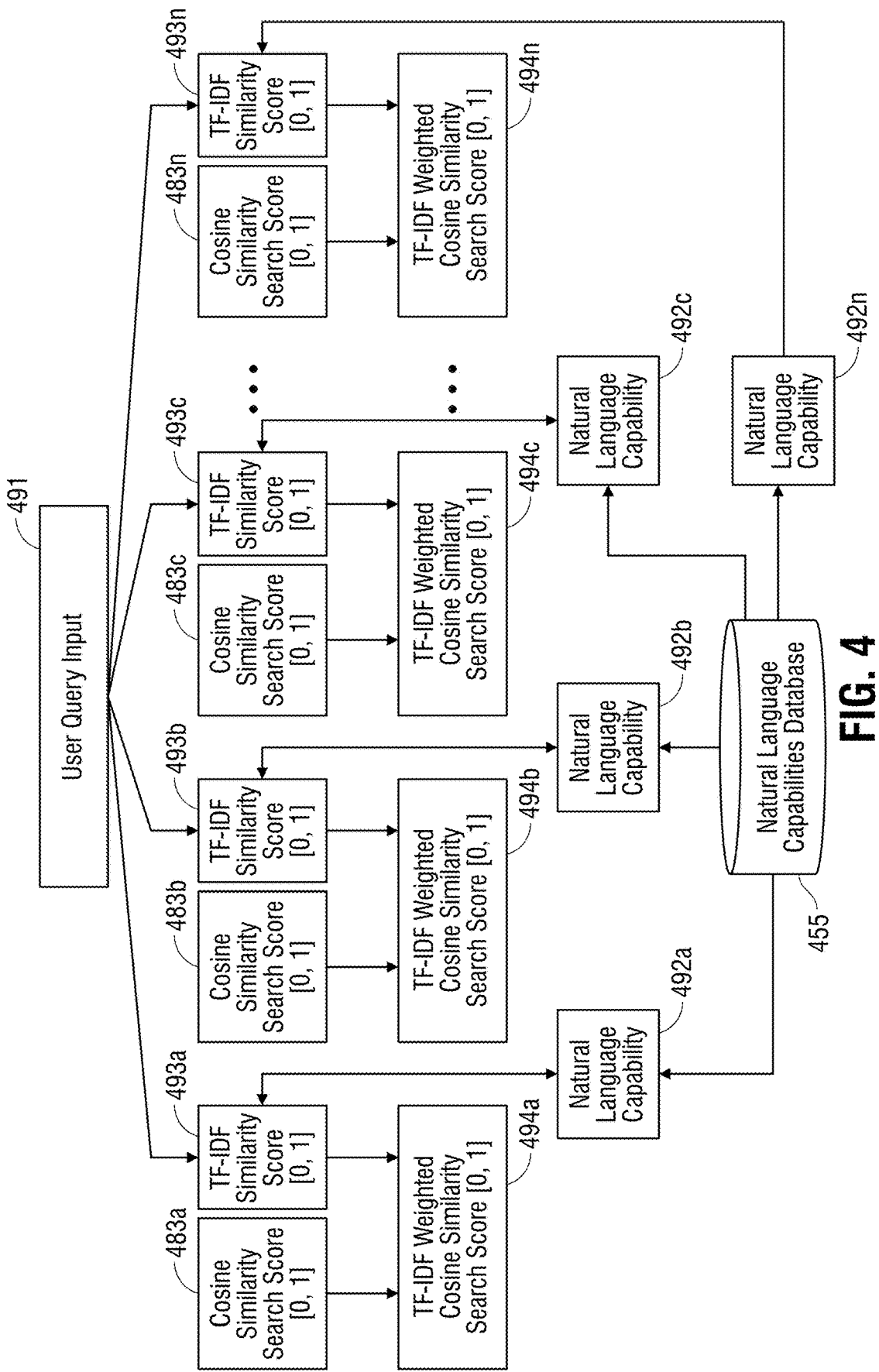
FIG. 4 is a block diagram illustrating a method of executing computer readable code instructions of modules of an OTB AI productivity tool to identify a capability that best matches a received user query input by weighting a semantic similarity search score by a text frequency-inverse document frequency (TF-IDF) similarity search score according to an embodiment of the present disclosure.

FIG. 4 is a block diagram illustrating a method of identifying capability of an artificial intelligence (AI) productivity tool enableable software application that best matches a received user query input by weighting a semantic similarity search score by a text frequency-inverse document frequency similarity search score according to an embodiment of the present disclosure. As described herein, while semantic search methodologies, such as that described above with respect to FIG. 3 are better-suited than TF-IDF methodologies alone for use with natural language text excerpts for context accuracy, such as the user query input 491 and the natural language descriptions of capabilities 492*a* through 492*n*, TF-IDF methodologies are better-suited than semantic search methodologies where a single keyword within the user query input 491 is important to identifying a matching capability (e.g., 492*a*, 492*b*, 492*c*, up to 492*n*) for an AI productivity tool-enableable software application to address the user's concerns. For example, a user may provide a natural language user query input 491 such as "resolve error code 0xc0000142." In such a scenario the semantic search methodologies described above with respect to FIG. 3 may identify that an error code needs to be resolved, but it may not focus heavily on the term "0xc0000142," which may be important or determinative in finding the right capability (e.g., 492*a*, 492*b*, 492*c*, or 492*n*) for an AI productivity tool enableable software application to resolve the error code. In such a case, it may be useful to also perform a TF-IDF comparison for the user query input 491 across the stored natural language descriptions of the capabilities (e.g., 492*a*, 492*b*, 492*c* to 492*n*) within the natural language capabilities database 455 to identify the capability (e.g., 492*c*) that best addresses the specific term "0xc0000142."

As described herein, in order to increase the accuracy of the cosine or other semantic similarity search scores, such as 383*a* to 383*n* of FIG. 3 above in determining when a capability for an AI productivity tool enableable software application may address the user's request within a received user query input, the hardware processor executing machine readable code instructions for the query intent to capability determination module of the OTB AI productivity tool in an embodiment may, for each compared user query input 491 and natural language capability 492*a* to 492*n*, perform a TF-IDF comparison. For example, as shown in FIG. 4, and as part of the similarity search described above with reference to FIG. 3, the hardware processor executing machine readable code instructions for the similarity search module may determine the cosine or other semantic similarity search score 483a describing a degree of similarity between the query input intent value (381 of FIG. 3) for the user query input 491 and the capability intent value (382a of FIG. 3) for a natural language description of a capability 492a stored within the natural language capabilities database 455. As another example, the hardware processor executing machine readable code instructions for the similarity search module may determine the cosine or other semantic similarity search score 483b describing a degree of similarity between the query input intent value (381 of FIG. 3) for the user query input 491 and the capability intent value (382b of FIG. 3) for a natural language description of a capability 492b stored within the natural language capabilities database 455. In yet another example, the hardware processor executing machine readable code instructions for the similarity search module may determine the cosine or other semantic similarity search score 483c describing a degree of similarity between the query input intent value (381 of FIG. 3) for the user query input 491 and the capability intent value (382c of FIG. 3) for a natural language description of a capability 492c stored within the natural language capabilities database 455. This may be repeated for each of the natural language capabilities (e.g., up to 492n) stored within the natural language capabilities database 455, to produce a cosine or other semantic similarity search score of 483n.

In an embodiment, each of these cosine similarity search scores 482a to 482n may then be weighted by a TF-IDF similarity score (e.g., 493a to 493n, respectively), in order to increase the accuracy of the cosine similarity or other semantic search scores 483a to 483n in determining when a capability (e.g., 492a to 492n) for an AI productivity tool enableable software application may address the user's request within the received user query input 491. For example, the hardware processor executing code instructions for the similarity search module (280 of FIG. 2) may perform a TF-IDF algorithm to measure the frequency with which each of a plurality of natural language terms appear within the user query input 491, as weighted by the frequency with which that term occurs in one of each of the natural language capabilities 492a to 492n stored within the natural language capabilities database 455. More specifically, the hardware processor executing code instructions for a TF-IDF algorithm may determine a TF-IDF similarity score 493a measuring the frequency with which each of a plurality of natural language terms, including "0xc0000142" appear in the user query input 491, as weighted by the frequency with which each of those terms also occur within the natural language capability 492a. As another example, the hardware processor executing code instructions for a TF-IDF algorithm may determine a TF-IDF similarity score 493b measuring the frequency with which each of a plurality of natural language terms, including "0xc0000142" appear in the user query input 491, as weighted by the frequency with which each of those terms occur within the natural language capability 492b. In yet another example, the hardware processor executing code instructions for a TF-IDF algorithm may determine a TF-IDF similarity score 493c measuring the frequency with which each of a plurality of natural language terms, including "0xc0000142" appear in the user query input 491, as weighted by the frequency with which each of those terms occur within the natural language capability 492c. This may be repeated for each of the natural language capabilities (e.g., up to 492n) stored within the natural language capabilities database 455, to produce a TF-IDF similarity search score of 493n. Each TF-IDF similarity score determined in such a way may have a value between zero and one. Thus, if there is a TF-IDF match of a term such as "0xc0000142" with that term in a capability natural language description, the capability will have an increased weighting for a match over other capabilities that do not contain this term in embodiments herein. It is contemplated that any number of known or later-developed TF-IDF comparison algorithms may be used, including the best-match 25 (BM25) algorithm, the Okapi BM25 algorithm, and the BM-25 with fields (BM-25F).

Each of the cosine or other semantic similarity search scores 483a to 483n output of the semantic search comparison is be weighted by one of the TF-IDF similarity search scores 493a to 493n, respectively, for each natural language capability 492a to 492n, respectively, that is compared to the user query input 491, via the hardware processor executing machine readable code instructions of the query intent to capability determination module. For example, the cosine or other semantic similarity search scores 483a to 483n may be multiplied by the TF-IDF similarity search scores 493a to 493n, respectively in an embodiment. In another example embodiment, a TF-IDF weighted cosine or other semantic similarity search score 494a may be determined by a hardware processor executing code instructions of the query intent to capability determination module as equivalent to one plus the cosine or other semantic similarity search score 483a, multiplied by one plus the TF-IDF similarity search score 493a. In still another example embodiment, a TF-IDF weighted cosine or other semantic similarity search score 494b may be determined by a hardware processor executing code instructions of the query intent to capability determination module as equivalent to one plus the cosine or other semantic similarity search score 483b, multiplied by one plus the TF-IDF similarity search score 493b. In yet another example embodiment, a TF-IDF weighted cosine or other semantic similarity search score 494c may be determined by a hardware processor executing code instructions of the query intent to capability determination module as equivalent to one plus the cosine or other semantic similarity search score 483c, multiplied by one plus the TF-IDF similarity search score 493c. This may be repeated for each of the natural language capabilities (e.g., up to 492n) stored within the natural language capabilities database 455, to produce a TF-IDF weighted or other semantic cosine similarity search score of 494n.

The natural language capability (e.g., 492c that may include the keyword "0xc0000142") for an AI productivity tool enableable software application having the highest TF-IDF weighted cosine or other semantic similarity search score may then be identified, via execution of machine readable code instructions of the query intent to capability determination module by the hardware processor, as the capability (e.g., 492c) most likely to address the user's intended request within the natural language user query input 491. In such a way, the hardware processor executing code instructions for the query intent to capability module for the OTB AI productivity tool may enhance semantic search performance by also considering critical keywords when determining a matching capability of an AI productivity tool enableable software application that is most likely to address the user's intent within the user query input.

Figure 5:
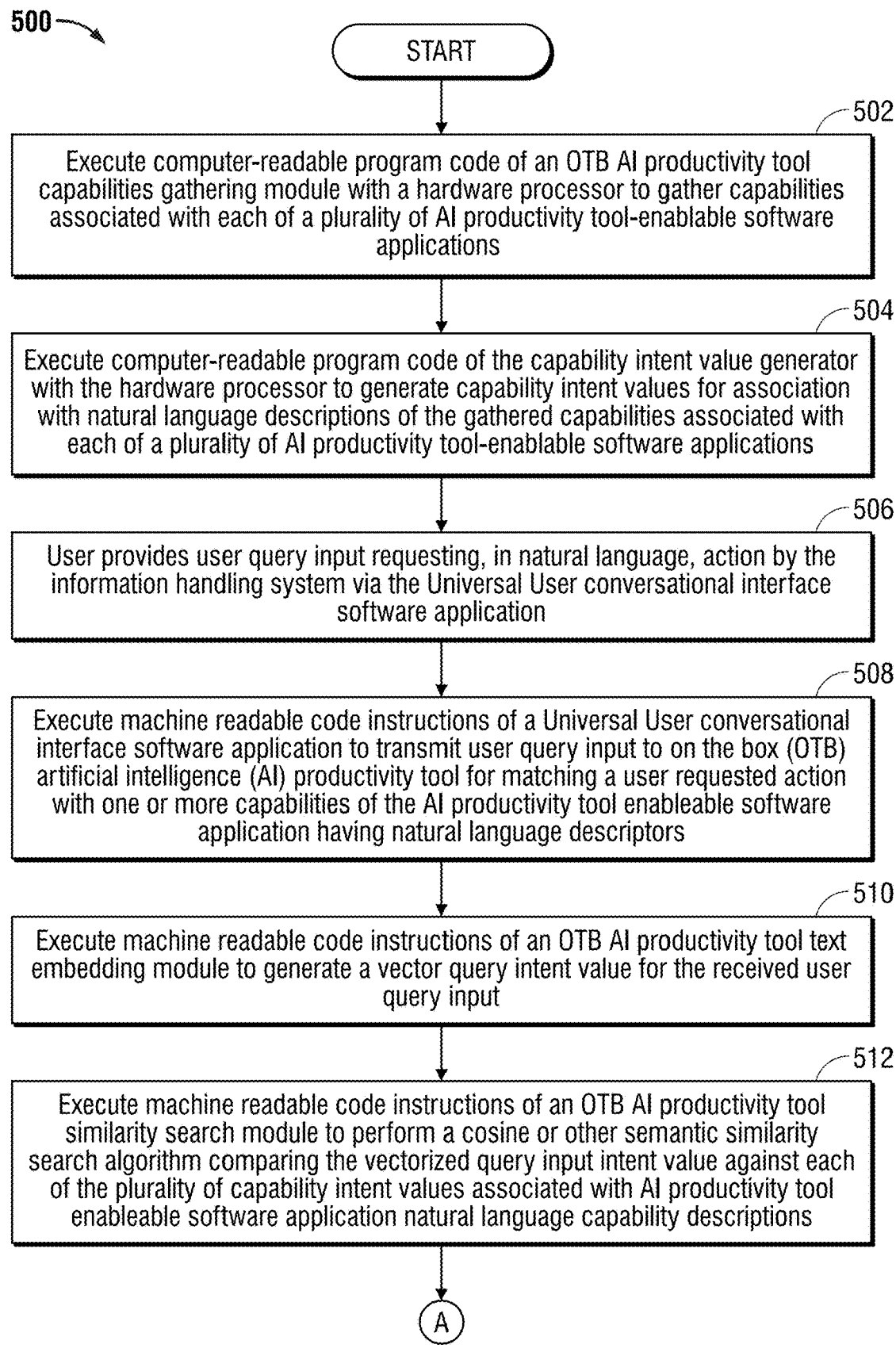
FIG. 5 is a flowchart showing a method of executing computer readable code instructions of modules of an OTB AI productivity tool to identify a capability that best matches a received user query input through a TF-IDF weighted semantic search that considers context of terms as well as keywords within the user query input according to an embodiment of the present disclosure.
Figure 5:
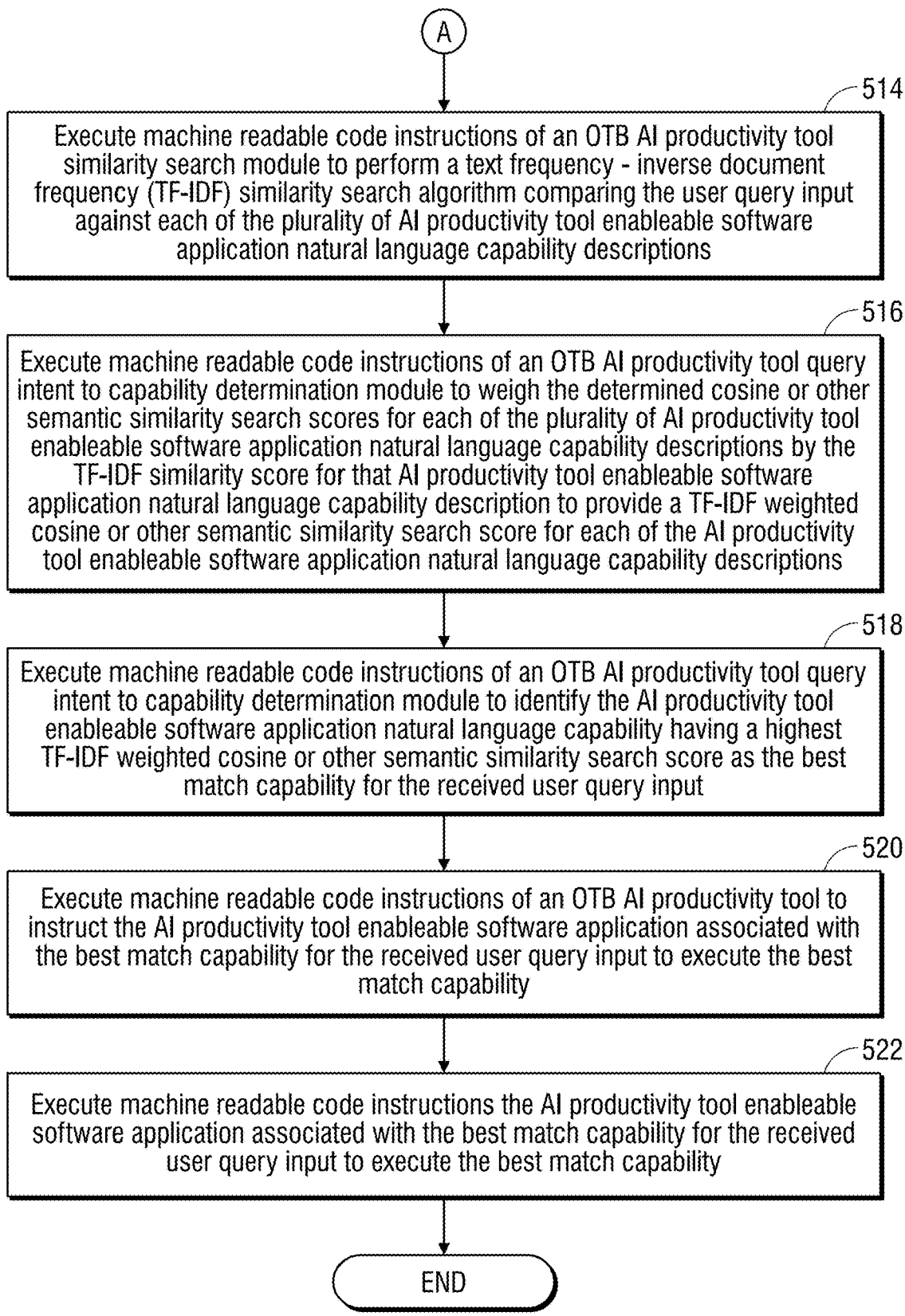

FIG. 5 is a flowchart 500 showing a method of identifying a capability of an artificial intelligence (AI) productivity tool enableable software application that best matches a received user query input through a text frequency-inverse document frequency (TF-IDF) weighted semantic search that considers context of terms as well as keywords within the user query input according to an embodiment of the present disclosure. It is appreciated that the method 500 described herein may be executed via execution of computer readable program code instructions in firmware or software by a hardware processor or other hardware processing device on an information handling system.

The method 500 may include, at block 502, executing computer-readable program code instructions of a capabilities gathering module via a hardware processor, hardware controller or other hardware processing resource to gather capabilities associated with each of a plurality of AI productivity tool-enablable software applications. These capabilities gathered by The capabilities gathering module may include any input and output capabilities provided by the AI productivity tool-enablable software applications being executed or to be executed by the hardware processor or any other hardware processing devices of an information handling system. For example, an AI productivity tool-enablable software application may include a word processing application such as Microsoft® Word® that may receive input (e.g., via voice at a microphone or text via a keyboard) and provide output via text. Still further, other examples of an AI productivity tool-enablable software application may include a software updating system, virus protection software, and setting optimization software such as Dell® SupportAssist® module that are code instructions executable by the hardware processor or other hardware processing resource of the information handling system. With SupportAssist®, a user may provide input via, for example, the microphone requesting information related to a setting associated with the information handling system. Thus, capabilities of SupportAssist® may include virus protection capabilities, setting manipulation capabilities, and software updating capabilities that may each be detected and gathered via the execution of the capabilities gathering module for use and categorization of these capabilities as described herein.

Even further, examples of an AI productivity tool-enablable software application may include Dell® Display®/Peripheral Manager®. The Dell® Display®/Peripheral Manager® may be computer-readable program code instructions that have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® subagent may be gathered by the capabilities gathering module for later determination of capability vector intent values and categorization as described herein. It is appreciated that any AI productivity tool-enablable software application of computer-readable program code instructions in software, firmware, or some combination that may publish or provide a listing of capabilities to be gathered by the capabilities gathering module. For example, each AI productivity tool-enablable software application publish or have assigned to it one or more descriptor terms or phrases for capabilities of the AI productivity tool-enablable software application for use with an OTB AI productivity tool, such as for with a chatbot natural language system. Further examples of AI productivity tool-enablable applications may include, for example, Dell® Trusted Device® application, a remediation Dell® APEX Managed Device Service (AMDS)® AI productivity tool-enablable software application, Alienware Command Center (AWCC)® AI productivity tool-enablable software application, among others. The capabilities of each of these AI productivity tool-enablable software applications, including descriptors associated with those capabilities, may be gathered via execution, by the hardware processor or any other hardware processing device, of the capabilities gathering module.

At block 504, the method 500 includes an information handling system hardware processor, hardware controller, or other hardware processing resource executing computer-readable program code of the capability intent value generator to generate capability intent values with execution of a text embedding machine learning model for association with the natural language descriptions or descriptors for those gathered capabilities associated with each of a plurality of AI productivity tool-enablable software applications. Execution of computer-readable program code of the capability intent value generator may cause the specific words, sets of words, phrases, or order of word usage associated with the natural language descriptors of capabilities of each of the AI productivity tool-enablable software applications described herein to be used to generate vectorized capability intent values for those capabilities. For example, a capability intent value for association with the natural language description of the various capabilities associated with the Dell® SupportAssist® may include descriptors such as "virus protection," "updating," "update," "settings," "settings optimization," and the like that describe these capabilities. Similar or other descriptors may be associated with a plurality of other capabilities for additional AI productivity tool-enablable software applications in embodiments herein. Each of these capability intent vector values for association with the natural language descriptions of these capabilities and their capability intent vector values may also be associated with a capability ID such as an alphanumeric ID that may identify, uniquely, these capabilities for storage in a database for example or for publication, storage, and use with embodiments herein.

As a specific example, the hardware processor executing machine readable code instructions for a capability intent value generator of the OTB AI productivity tool may determine capability intent values associated with natural language descriptions of the gathered capabilities for each of a plurality of AI productivity tool-enablable software applications. Such natural language descriptions of the gathered capabilities may include keywords that are best recognized by TF-IDF comparisons, such as words not having known synonyms. For example, such a keyword may include a specific alpha-numeric coding for an error code.

The capability intent values are a mathematical representation of the natural language descriptions of capability operations or services from various AI productivity tool-enablable software applications in an embodiment. These capability intent values may be represented by a mathematical value in a multi-axis vector space that may be associated with the natural language description for that capability or intent. In an embodiment, the capabilities may also be associated with an identification (ID) such as an alphanumeric ID that may be stored within a capability intent values database. These capabilities stored at the capability intent values database may include any input and output capabilities provided by the AI productivity tool-enablable software applications being executed by the hardware processor or any other hardware processing devices.

At block 506, a user in an embodiment may provide a user query input requesting, in natural language, an action or response by the information handling system via the universal user conversational interface software application or other interface (e.g., specific for an AI productivity tool enableable software application). For example, a user may provide text or voice data (e.g., via IO device 116, or microphone 118 of FIG. 1) to a universal user conversational interface, operating as a chatbot to simulate a conversation between the user and any of several AI productivity tool enableable software applications.

The hardware processor in an embodiment at block 508 may execute machine readable code instructions of a universal user conversational interface software application or other interface to transmit the user query input to the OTB AI productivity tool for matching a user requested action in a user query input with natural language capabilities of the AI productivity tool enableable software application. For example, in an embodiment described at FIG. 2, once the capabilities have been gathered (e.g., at block 502) at natural language capabilities database 255, the hardware processor 202 executing machine readable code instructions of the OTB AI productivity tool 250 in an embodiment may receive a user query input, via the universal user conversational interface software application 270 or other interface requesting that an action be taken at the information handling system. The OTB AI productivity tool 250 may later use machine-learning methodologies to determine a capability stored at the natural language capability database 255 for an AI productivity tool enableable software application 211, that can address the request in the user query input, as described further below.

At block 510, the hardware processor in an embodiment may execute machine readable code instructions of an OTB AI productivity tool text embedding module to generate a vector query intent value for the received user query input. For example, in an embodiment in which the user provides a user query input in the form of voice data to the AI productivity tool enableable software application 211 via the OTB AI productivity tool 250 and the universal software application conversation interface 270, the hardware processor 202 executing machine-readable code instructions of an automated speech recognition (ASR) module 263 to detect words within the recorded voice data. The hardware processor 202 may also execute machine readable code instructions of a text embedding module 265 to detect which of these words are nouns, verbs, or commonly used sentence structures and generate a vectorized query input intent value for the user query input.

As also described in an example embodiment with respect to FIG. 3, the natural language capabilities for a plurality of AI productivity tool enableable software applications are provided text descriptors that may be processed into capability intent values, such as 381 in a multi-axis vector space, such that these intent value mathematical representations of a user query input and a capability may be correlated by a semantic similarity search to select a capability responsive to a user query input. Any number of axes for the multi-axis vector spaces may be used in various embodiments. Indeed, many capability intent value generators or other machine learning algorithms for determining capability intent vector values for natural language terms or phrases and contemplated for use in embodiments herein utilize capability intent vector values that might be plotted among plural axes well above the three axis multi-axis vector spaces. For example, multi-axis vector spaces having 500 to 700 or more axes are contemplated for use with natural language algorithms with embodiments herein.

Each axis of the multi-axis vector space may provide a measurement of various attributes of a text excerpt that are known to provide context or semantic understanding of the text. For example, a reader's understanding of a given text excerpt may depend upon the reader's knowledge of any given word's meaning within the text, identified phrases within the text, or the understood order or sequence of words within the text. More specifically, the reader's understanding is enhanced by the reader having a larger vocabulary and understanding of which words in that vocabulary are synonyms (closer in meaning) to a given word in that text, and which words are antonyms (further away in meaning) to that given word. Thus, the text embedding algorithm system's ability to incorporate values and identify common phrases of words grouped together and the importance of word order with the value of the generated vector intent value for a capability or query adds to the semantic meaning of a text excerpt using such a phrase to distinguish the semantic meaning in the generated vector intent value. Thus, the semantic similarity machine learning model algorithm may more accurately identify similarities of unique query intent values with capability intent values in embodiments herein.

Each axis of the multi-axis vector space, and thus, each value within a vector within such a multi-axis vector space may provide a measurement of these various attributes within a given intent value in embodiments herein. For example, a vector for a user query input intent value or for capability intent value may provide a measurement of similarity between any given word within the user query input or AI productivity tool enablable software application capabilities, respectively, a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the user query input and the natural language descriptors for the capabilities of the AI productivity tool enableable software applications. These vectors may then be compared to one another in order to understand, not only which individual words are used and their frequencies (as determined through TF-IDF comparison), but also how alike various phrases within the user query input and capabilities are, and how alike the usage of those words and phrases are to provide a context, such as influenced by the order of those words or phrases and their relation to one another.

Several text embedding algorithms may be used in various embodiments herein in order to provide such a mathematical representation of semantic understanding. For example, the text embedding module (265 of FIG. 2) may employ a Latent Semantic Analysis (LSA) or Latent Dirichlet allocation (LDA) which may define how close each of the observed terms in the received user query input are to various synonyms. As another example, the text embedding module (265 of FIG. 2) may employ a Word2Vec algorithm, which includes a neural network trained to understand which terms or phrases should be considered closer or further away from certain synonyms or antonyms. As yet another example, the text embedding module (265 of FIG. 2) may employ a fully recurrent neural network trained to consider the order of terms within the received user query input or the natural language descriptors of the capabilities for the AI productivity tool enableable software applications.

A hardware processor in an embodiment at block 512 may execute machine readable code instructions of an OTB AI productivity tool similarity search module to execute machine readable code instructions to perform a cosine similarity search algorithm comparing the vector query intent value against each of the plurality of capability intent values associated with AI productivity tool enableable software application natural language capability descriptions. For example, a hardware processor may execute machine readable code instructions for a semantic similarity search machine learning model, via executing machine readable code instructions of a query intent to capability module, that compares the vectorized user query input intent value 381 and the capability intent values 382a-382n stored within the capability intent values database 356. Such a comparison may be performed using a semantic search machine learning model, such as a cosine similarity search algorithm that compares the distance or vector value differences in a multi-axis vector space between two vectors (e.g., 381 and each of 382a, 382b, 382c, to 382n) to determine the contextual similarity between the natural language description of the capabilities having the capability intent values 382a to 382n and the natural language user query input having the user query input intent value 381. This may be performed for several of the capability intent values (such as 382a, 382b, 382c, to 382n) stored within the capability intent value database 356 to identify a capability intent value (e.g., 382a) that most closely matches the user query input value 381.

A hardware processor executing machine readable code instructions for a semantic search machine learning model of the similarity search module (e.g., 280 of FIG. 2) may determine a distance between the query input intent value 381 and each of a plurality of capability intent values 382a to 382n. Then, for each of those determined distances, the hardware processor executing machine readable code instructions for a semantic search machine learning model of the similarity search module (e.g., 280 of FIG. 2) may determine an angular similarity having a value between zero and one for the query input intent value 381 and each of a plurality of capability intent values 382a to 382n. This angular similarity value in an embodiment may comprise the cosine similarity search score (e.g., 383a, 383b, 383c to 383n) for a given capability intent value (e.g., 382a, 382b, 382c to 382n, respectively), where zero is a worst match and one is a best match between the given capability intent value (e.g., 382a, 382b, 382c to 382n) and the query input intent value 381. In such a way, a hardware processor executing code instructions for the query intent to capability module for the OTB AI productivity tool may take relevance and context of natural language within a user query input into account when determining a matching capability of an AI productivity tool enableable software application that is most likely to address the user's intent within the user query input.

At block 514, in some embodiments, the hardware processor may execute machine readable code instructions of an OTB AI productivity tool similarity search module to perform a TF-IDF similarity search algorithm comparing the query input terms in natural language text against each of the plurality of AI productivity tool enableable software application natural language capability descriptions. For example, in an embodiment described with reference to FIGS. 2 and 4, the hardware processor executing code instructions for the similarity search module 280 may perform a TF-IDF algorithm to measure the frequency with which each of a plurality of natural language terms appear within the user query input 491, as weighted by the frequency with which that term occurs in one of each of the natural language descriptions of capabilities 492a to 492n stored within the natural language capabilities database 455. More specifically, the hardware processor executing code instructions for a TF-IDF algorithm may determine a TF-IDF similarity score 493a measuring the frequency with which each of a plurality of natural language terms, including unique terms having no known synonyms, such as "0xc0000142" for example, appear in the user query input 491, as weighted by the frequency with which each of those terms occur within the natural language description of the capability 492a. As another example, the hardware processor executing code instructions for a TF-IDF algorithm may determine a TF-IDF similarity score 493b measuring the frequency with which each of a plurality of natural language terms, including "0xc0000142" for example, appear in the user query input 491, as weighted by the frequency with which each of those terms occur within the natural language description of the capability 492b. In yet another example, the hardware processor executing code instructions for a TF-IDF algorithm may determine a TF-IDF similarity score 493c measuring the frequency with which each of a plurality of natural language terms, including "0xc0000142" for example, appear in the user query input 491, as weighted by the frequency with which each of those terms occur within the natural language description of the capability 492c. This may be repeated for each of the natural language descriptions of the capabilities (e.g., up to 492n) stored within the natural language capabilities database 455, to produce a TF-IDF similarity search score of 493n.

The hardware processor in an embodiment at block 516 may execute machine readable code instructions of an OTB AI productivity tool query intent to capability determination module to weigh the determined cosine or other semantic similarity search scores for each of the plurality of AI productivity tool enableable software application natural language capability descriptions by the TF-IDF similarity score for that AI productivity tool enableable software application natural language capability description, to provide a TF-IDF weighted cosine or other semantic similarity search score for each of the AI productivity tool enableable software application natural language capability descriptions. For example, the cosine or other semantic similarity search scores 483a to 483n may be multiplied by the TF-IDF similarity search scores 493a to 493n, respectively in an embodiment. In another example embodiment, a TF-IDF weighted or other semantic cosine similarity search score 494a may be determined by a hardware processor executing code instructions of the query intent to capability determination module as equivalent to one plus the cosine or other semantic similarity search score 483a, multiplied by one plus the TF-IDF similarity search score 493a. In still another example embodiment, a TF-IDF weighted or other semantic cosine similarity search score 494b may be determined by a hardware processor executing code instructions of the query intent to capability determination module as equivalent to one plus the cosine or other semantic similarity search score 483b, multiplied by one plus the TF-IDF similarity search score 493b. In yet another example embodiment, a TF-IDF weighted cosine or other semantic similarity search score 494c may be determined by a hardware processor executing code instructions of the query intent to capability determination module as equivalent to one plus the cosine or other semantic similarity search score 483c, multiplied by one plus the TF-IDF similarity search score 493c. This may be repeated for each of the natural language capabilities (e.g., up to 492n) stored within the natural language capabilities database 455, to produce a TF-IDF weighted cosine or other semantic similarity search score of 494n.

At block 518, a hardware processor may execute machine readable code instructions of an OTB AI productivity tool query intent to capability determination module to identify the AI productivity tool enableable software application natural language capability having a highest TF-IDF weighted cosine or other semantic similarity search score as the best match capability for the received user query input. For example, the natural language capability (e.g., 492c that includes the keyword "0xc0000142" in one example) for an AI productivity tool enableable software application having the highest TF-IDF weighted cosine or other semantic similarity search score may be identified, via execution of machine readable code instructions of the query intent to capability determination module by the hardware processor as the capability (e.g., 492c), that is most likely to address the user's intended request within the natural language user query input 491. In such a way, the hardware processor executing code instructions for the query intent to capability module for the OTB AI productivity tool may enhance semantic search performance by also considering critical keywords when determining a matching capability of an AI productivity tool enableable software application that is most likely to address the user's intent within the user query input.

The hardware processor in an embodiment at block 520 may execute machine readable code instructions of an OTB AI productivity tool to instruct the AI productivity tool enableable software application associated with the best match capability for the received user query input to execute the best match capability. For example, in an embodiment, the hardware processor executing machine readable code instructions of the OTB AI productivity tool determines that the best match capability is the capability 493c, which includes the keyword "0xc0000142," and is associated with the AI productivity tool enableable software application 211 of FIG. 2. In such an embodiment, the hardware processor may execute machine readable code instructions of the OTB AI productivity tool to instruct the AI productivity tool enableable software application 211 to execute the capability 493c.

Thus, the hardware processor of the information handling system may respond to a user input query with an artificial intelligence responsive action to execute machine readable code instructions the AI productivity tool enableable software application associated with the best match capability for the received user query input to execute the best match capability. For example, the hardware processor 202 may execute machine readable code instructions the AI productivity tool enableable software application 211 associated with the best match capability 493c for the received user query input to execute the best match capability 493c. The method for identifying a capability of an AI productivity tool enableable software application that best matches a received user query input through a TF-IDF weighted semantic search that considers context of terms as well as keywords within the user query input may then end.

The blocks of the flow diagram of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer readable code instructions for an on the box (OTB) artificial intelligence (AI) productivity tool for selecting a capability of an AI productivity tool-enablable software application in responding to a user query input comprising:
   a hardware processor executing computer-readable program code instructions for gathering natural language descriptions of capabilities associated with each of a plurality of AI productivity tool-enablable software applications;
   the hardware processor executing computer-readable program code instructions for generating capability intent values from the natural language descriptions of the gathered capabilities;
   the hardware processor executing computer-readable program code instructions for generating a query input intent value for a user query input received via text or audio requesting an action to be taken by one of the plurality of AI productivity tool-enableable software applications executing on the information handling system;
   the hardware processor executing computer-readable program code instructions for performing a cosine semantic similarity search comparing the capability intent values to the query input intent value to identify a best match capability for the received user query input having a capability intent value that generates a highest cosine semantic similarity search score, wherein the cosine semantic similarity search determines a degree of angular similarity between vector values for the capability intent values and the query input intent value that mathematically represent a first phrase within natural language of the user query input and any of a plurality of phrases within the natural language descriptions for the gathered capabilities; and
   the hardware processor executing computer-readable program code instructions for instructing a first of the plurality of AI productivity tool-enableable software applications having the best match capability to execute the best match capability in response to the user query input.

2. The information handling system of claim 1 further comprising:
the hardware processor executing computer-readable program code instructions of a capabilities gathering module of the OTB AI productivity tool for storing the capability intent values as vectors in a multi-axis vector space, associated with an identification (ID) such as an alphanumeric ID, for each of the capabilities.

3. The information handling system of claim 1 further comprising:
the hardware processor executing computer-readable program code instructions of the AI productivity tool-enablable software application to perform the best match capability to provide responsive output via text.

4. The information handling system of claim 1 further comprising:
the hardware processor executing computer-readable program code instructions of the AI productivity tool-enablable software application to perform the best match capability to automatically update one or more local software applications.

5. The information handling system of claim 1, wherein the capability intent values are generated by execution of code instructions for a text embedding algorithm and mathematically represent semantic meaning for words or phrases within the natural language descriptions for the gathered capabilities for correlation with the query intent input value generated from the user query input text.

6. The information handling system of claim 1 further comprising:
the hardware processor executing computer readable program code instructions of the AI productivity tool-enablable software application to perform the best match capability to automatically update one or more local software applications.

7. The information handling system of claim 1 further comprising:
the hardware processor executing computer-readable program code instructions for performing a text frequency-inverted document frequency (TF-IDF) comparison between natural language of the user query input and each of the natural language descriptions for the gathered capabilities; and
the hardware processor executing computer-readable program code instructions for weighting a cosine semantic similarity search score for each of the gathered capabilities by a TF-IDF comparison score for each of the gathered capabilities to determine a highest weighted cosine semantic similarity search score.

8. A method for executing computer readable code instructions of an on the box (OTB) artificial intelligence (AI) productivity tool at an information handling system to respond to a user query input comprising:
gathering, via a hardware processor executing computer-readable program code instructions, natural language descriptions of capabilities associated with each of a plurality of AI productivity tool-enablable software applications;
generating, via the hardware processor executing computer-readable program code instructions, capability intent values from natural language descriptions of the gathered capabilities;
receiving a user query input and generating, via a hardware processor, a query input intent value for the user query input, where the user query input requests an action to be taken by one of the plurality of AI productivity tool-enableable software applications;
executing computer-readable code instructions, via the hardware processor, to determine a cosine semantic similarity search score for each of the gathered capabilities by executing a cosine semantic similarity search algorithm comparing the capability intent values to the query input intent value;
determining, via the hardware processor, a text frequency-inverted document frequency (TF-IDF) score for each of the gathered capabilities by executing computer-readable code instructions of a TF-IDF comparison between natural language of the user query input and the natural language descriptions of each of the gathered capabilities;
generating, via the hardware processor executing computer-readable program code instructions, a weighted cosine similarity score for each of the gathered capabilities by weighing the cosine similarity search score for each of the gathered capabilities by the TF-IDF comparison score for each of the gathered capabilities;
identifying, via the hardware processor, a best match capability for the received user query input having a capability intent value that generates a highest weighted cosine similarity search score; and
instructing, via the hardware processor executing computer-readable program code instructions, a first of the plurality of AI productivity tool-enableable software applications having the best match capability to execute the best match capability.

9. The method of claim 8, wherein the capability intent values are generated by execution of code instructions for a text embedding algorithm and mathematically represent semantic meaning for words or phrases within the natural language descriptions for the gathered capabilities for correlation with the natural language of the query input intent value generated from the natural language of the user query input.

10. The method of claim 8, wherein computer-readable program code instructions of a latent semantic analysis text embedding algorithm are executed via the hardware processor for generating the capability intent values and the query input intent value.

11. The method of claim 8, wherein computer-readable program code instructions of a Word2Vec neural network text embedding algorithm trained to determine a degree of similarity between natural language words within the user query input and natural language words within the natural language descriptions of the gathered capabilities are executed via the hardware processor for generating the capability intent values and the query input intent value.

12. The method of claim 8, wherein computer-readable program code instructions of a recurrent neural network (RNN) text embedding algorithm trained to determine importance of order for a first plurality of natural language words within the user query input and other pluralities of natural language words within the natural language descriptions of the gathered capabilities are executed via the hardware processor for generating the capability intent values and the query input intent value.

13. The method of claim 8 further comprising:
executing computer-readable program code instructions of the AI productivity tool-enablable software application, via the hardware processor, to perform the best match capability to optimize settings for a display device.

14. The method of claim 8 further comprising:
executing computer-readable program code instructions of the AI productivity tool-enablable software application, via the hardware processor, to perform the best match capability to provide software virus protection.

15. An information handling system executing computer readable code instructions for an on the box (OTB) artificial intelligence (AI) productivity tool for selecting a capability of an AI productivity tool-enablable software application in responding to a user query input comprising:
   a hardware processor executing computer-readable program code instructions for gathering natural language descriptions of capabilities associated with each of a plurality of AI productivity tool-enablable software applications;
   the hardware processor executing computer-readable program code instructions for generating capability intent values from the natural language descriptions of the gathered capabilities;
   the hardware processor executing computer-readable program code instructions for generating a query input intent value received via text or audio for a user query input requesting an action to be taken by one of the plurality of AI productivity tool-enableable software applications executing on the information handling system;
   the hardware processor executing computer-readable program code instructions for generating a semantic similarity search score for each of the gathered capabilities by performing a semantic similarity search comparing the capability intent values to the query input intent value;
   the hardware processor executing computer-readable program code instructions for generating a text frequency-inverted document frequency (TF-IDF) score for each of the gathered capabilities by performing a TF-IDF comparison between natural language the user query input and the natural language descriptions of each of the gathered capabilities;
   the hardware processor executing computer-readable program code instructions for generating a weighted semantic similarity score for each of the gathered capabilities by weighing the semantic similarity search score for each of the gathered capabilities by the TF-IDF comparison score for each of the gathered capabilities to identify a best match capability for the received user query input having a capability intent value that generates a highest weighted semantic similarity search score; and
   the hardware processor executing computer-readable program code instructions a first AI productivity tool-enableable software application of the plurality of AI productivity tool-enableable software applications having the best match capability to execute the best match capability.

16. The information handling system of claim 15, wherein the capability intent values are generated by execution of code instructions for a text embedding algorithm and mathematically represent semantic meaning for words or phrases within the natural language descriptions for the gathered capabilities for correlation with the natural language of the query input intent value generated from the natural language of the user query input.

17. The information handling system of claim 15, wherein the hardware processor executes computer-readable program code instructions of a cosine semantic search machine learning algorithm for generating the semantic similarity search score for each of the gathered capabilities by performing the semantic similarity search comparing the capability intent values to the query input intent value.

18. The information handling system of claim 15, wherein the hardware processor executes computer-readable program code instructions of a latent semantic analysis text embedding algorithm for generating the capability intent values and the query input intent value.

19. The information handling system of claim 15, wherein the hardware processor executes computer-readable program code instructions of a fully recurrent neural network (FRNN) text embedding algorithm trained to determine importance of order for a first plurality of natural language words within the user query input and pluralities of natural language words within the natural language descriptions of the gathered capabilities to generate the capability intent values and the query input intent value.

20. The OTB AI productivity tool of claim 15 further comprising:
   the hardware processor executing computer-readable program code instructions of the AI productivity tool-enablable software application to perform the best match capability to automatically update one or more local software applications.

* * * * *